(12) United States Patent
Sharma et al.

(10) Patent No.: US 11,869,537 B1
(45) Date of Patent: *Jan. 9, 2024

(54) LANGUAGE AGNOSTIC AUTOMATED VOICE ACTIVITY DETECTION

(71) Applicant: Amazon Technologies, Inc., Seattle, WA (US)

(72) Inventors: Mayank Sharma, Bhopal (IN); Sandeep Joshi, Bangalore (IN); Muhammad Raffay Hamid, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 119 days.

This patent is subject to a terminal disclaimer.

(21) Appl. No.: 17/523,777

(22) Filed: Nov. 10, 2021

Related U.S. Application Data

(63) Continuation of application No. 16/436,351, filed on Jun. 10, 2019, now Pat. No. 11,205,445.

(51) Int. Cl.
| | |
|---|---|
| *G10L 25/84* | (2013.01) |
| *G10L 15/06* | (2013.01) |
| *G10L 15/22* | (2006.01) |
| *G10L 15/16* | (2006.01) |
| *G10L 25/18* | (2013.01) |

(52) U.S. Cl.
CPC ............ *G10L 25/84* (2013.01); *G10L 15/063* (2013.01); *G10L 15/16* (2013.01); *G10L 15/22* (2013.01); *G10L 25/18* (2013.01)

(58) Field of Classification Search
CPC ........ G10L 25/84; G10L 15/063; G10L 15/16; G10L 15/22; G10L 25/18
See application file for complete search history.

(56) References Cited

U.S. PATENT DOCUMENTS

| | | | | |
|---|---|---|---|---|
| 5,805,153 | A * | 9/1998 | Nielsen ............. | H04N 21/6581 348/553 |
| 9,026,438 | B2 * | 5/2015 | Buck ....................... | G10L 25/78 704/503 |
| 9,818,431 | B2 * | 11/2017 | Yu ....................... | G10L 21/0272 |
| 2006/0072905 | A1 * | 4/2006 | Kelly ................... | H04N 9/8042 386/E9.013 |
| 2013/0216202 | A1 * | 8/2013 | Palakshamurthy .. | H04N 9/8233 386/244 |
| 2014/0201631 | A1 * | 7/2014 | Pornprasitsakul ...... | G06F 40/58 715/716 |

(Continued)

*Primary Examiner* — Michael Colucci
(74) *Attorney, Agent, or Firm* — Eversheds Sutherland (US) LLP

(57) ABSTRACT

Systems, methods, and computer-readable media are disclosed for systems and methods for language agnostic automated voice activity detection. Example methods may include determining an audio file associated with video content, generating audio segments using the audio file, the audio segments including a first segment and a second segment, and determining that the first segment includes first voice activity. Methods may include determining that the second segment comprises second voice activity, determining that voice activity is present between a first timestamp associated with the first segment and a second timestamp associated with the second segment, and generating text data representing the voice activity that is present between the first timestamp and the second timestamp.

20 Claims, 7 Drawing Sheets

(56) References Cited

U.S. PATENT DOCUMENTS

| | | | | |
|---|---|---|---|---|
| 2016/0350655 A1* | 12/2016 | Weiss | .................... | G06N 3/044 |
| 2017/0278525 A1* | 9/2017 | Wang | .................... | G10L 15/20 |
| 2018/0189249 A1* | 7/2018 | Berman | ................ | G06F 40/58 |
| 2019/0095464 A1* | 3/2019 | Xie | ...................... | G06V 10/764 |
| 2019/0221213 A1* | 7/2019 | Shah | ...................... | G10L 15/22 |
| 2019/0318755 A1* | 10/2019 | Tashev | .................. | G06N 3/045 |
| 2019/0354836 A1* | 11/2019 | Shah | .................... | G06N 3/045 |
| 2019/0392866 A1* | 12/2019 | Yoon | .................... | G11B 27/28 |
| 2020/0143820 A1* | 5/2020 | Donofrio | .............. | H04R 1/406 |
| 2020/0293653 A1* | 9/2020 | Huang | ................... | G06N 3/08 |

* cited by examiner

LANGUAGE AGNOSTIC AUTOMATED VOICE ACTIVITY DETECTION

CROSS-REFERENCE TO RELATED APPLICATION

This application is a continuation of U.S. Ser. No. 16/436,351, filed Jun. 10, 2019, which is hereby incorporated by reference in its entirety.

BACKGROUND

Digital content, such as movies and television shows, may have subtitles. For example, digital content may be associated with a subtitle file that includes subtitles for presentation during consumption of the content, should a user desire to view the subtitles. Subtitles may be generated manually in some instances. For example, operators may consume the digital content and generate text for subtitles during consumption. Such manually processes and operations may be time consuming, as the operators may also designate a length of time and a sequence in which subtitles are to be presented. Accordingly, language agnostic automated voice activity detection may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
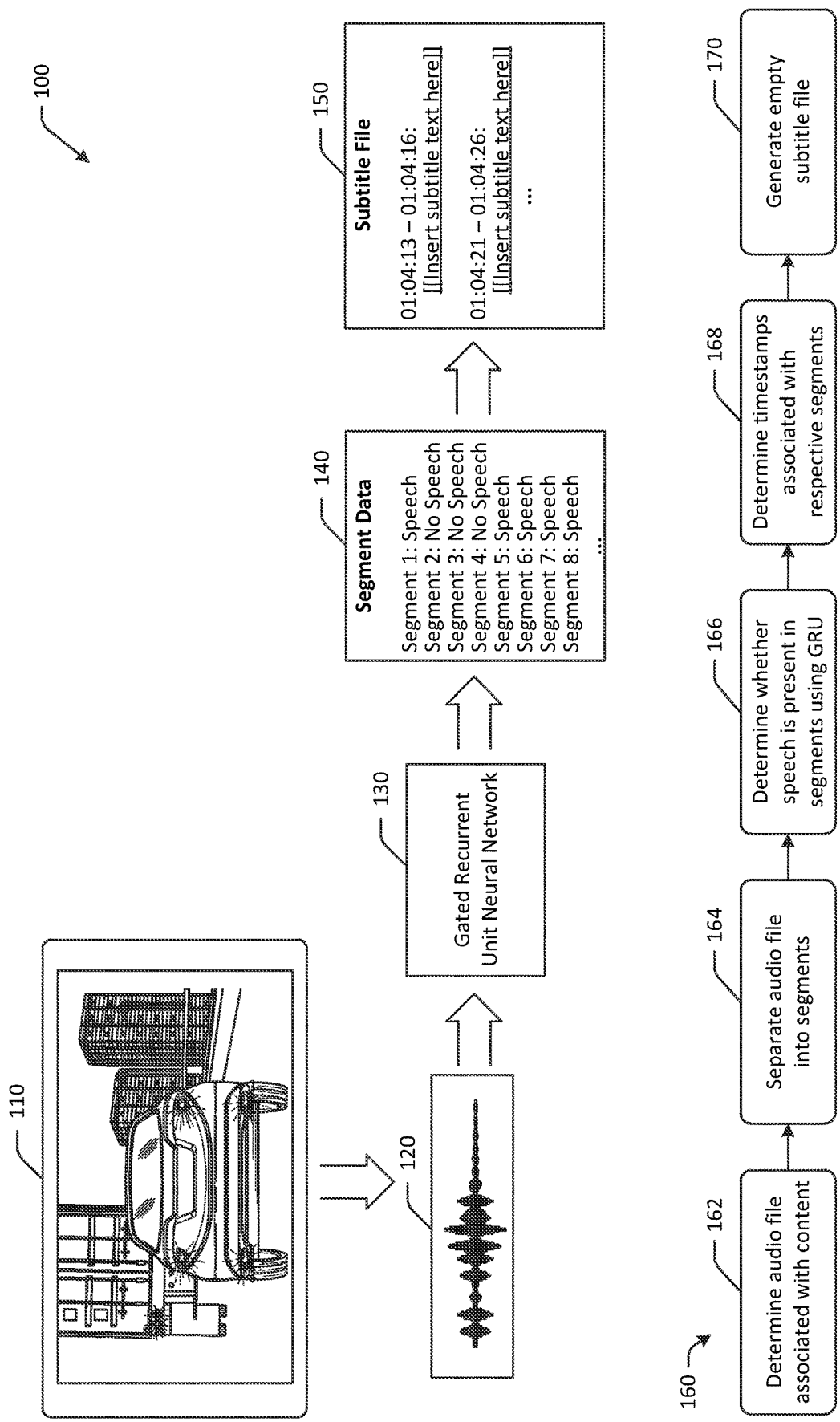
FIG. 1 is a schematic illustration of an example use case for language agnostic automated voice activity detection in accordance with one or more example embodiments of the disclosure.

Digital content may include video content, such as movies, television shows, streaming shows (e.g., made for Amazon Prime, Netflix, etc.), and other video content. Users may consume such video content. During consumption, users may desire to view subtitles, or text that corresponds to words spoken in audio format in the content. For example, users may enable subtitles when spoken audio is difficult to hear. The subtitles may be textual transcriptions of the words spoken by characters appearing in the content.

Subtitles may be presented for a certain duration and at particular points in time, so as to match a time when the words of a presented subtitle are actually spoken by a character. To generate subtitles, in some instances, operators or other users may manually view the content and type corresponding subtitles. Some or all of the subtitles may be associated with values such as a timestamp, which may indicate when the particular subtitle is to be presented, and/or a duration, which may indicate how long a subtitle should persist once presented. For example, a subtitle of "let's race these rally cars" may be presented at a timestamp of 01:40:00, or one hours forty minutes into a movie or other content, and may be presented for a duration of 3 seconds, or between 01:40:00 to 01:40:03. Users consuming the content may see the subtitle between 01:40:00 to 01:40:03 of the content.

However, when generating subtitle files, in some instances, operators may first create empty subtitle files. Empty subtitle files may be files in which timestamp(s) corresponding to instances where subtitles are needed (e.g., where characters are talking, etc.) are included, but the subtitles themselves are not included. Accordingly, empty subtitle files may include timestamps for which subtitle text is needed. In some instances, empty subtitle files may include a start timestamp and an end timestamp, or a start timestamp and a duration, during which voice activity and/or human speech occurs in digital content. Creating empty subtitle files may take manual operators about six to eight hours or longer per hour of content, and may therefore be time consuming. After empty subtitle files are created, the same or different operators may then return to the file and add in the subtitle text, in order to create a subtitle file for the content.

Embodiments of the disclosure include systems and methods for language agnostic and noise robust neural voice activity detection for digital content. Certain embodiments may automatically detect the presence of voice activity and/or human speech in audio, and may determine a confidence interval or probability value indicating a likelihood of accuracy. Some embodiments may detect voice activity regardless of a language that is spoken in the audio, and/or regardless of any noise (e.g., background noise, sound effects, music, etc.) present in the audio. Using the results of detected voice activity, some embodiments may automatically generate empty subtitle files for use by operators to insert subtitle text, thereby resulting in increased accuracy. For example, empty subtitle files created by manual operators may indicate a start timestamp and an end timestamp of human speech that occurs. However, the human speech may not occur for the entire duration between the start timestamp and end timestamp (e.g., there may be some silence, sound effects, music, etc.). Embodiments of the disclosure may generate empty subtitle files that account for the intervals of time in which no human speech or other voice activity is present, thereby increasing accuracy of subtitles.

This disclosure relates to, among other things, devices, systems, methods, computer-readable media, techniques, and methodologies for language agnostic automated voice activity detection and presentation. Certain embodiments may automatically generate empty subtitle files. Certain embodiments may determine a density of voice activity that occurs during a certain segment of audio or video content. Certain embodiments may be used to determine subtitle quality across different versions of content, such as censored versions of content, foreign versions of content, and so forth. In some instances, machine learning (e.g., deep neural networks, long short term memory units and/or recurrent neural networks, etc.) may be used to identify or determine the presence of voice activity.

Referring to FIG. 1, an example use case 100 for language agnostic automated voice activity detection is depicted in accordance with one or more example embodiments of the disclosure. In FIG. 1, digital content 110 may be determined. The digital content 110 may be a movie, television show, or any other suitable digital content for which voice detection is desired.

Audio data 120 associated with the digital content 110 may be determined. The audio data 120 may be in the form of an audio file, and may be associated with a video file of the digital content 110. The audio file may include audio to be presented during playback of the digital content 110.

Certain embodiments may include a gated recurrent unit neural network 130 that may be used to detect voice activity in the audio data 120. The gated recurrent unit neural network 130 may be executed by one or more remote servers and/or at a computer system or across a distributed computing environment. Voice activity may include human speech or other sounds. The gated recurrent unit neural network 130 may be a form of a recurrent neural network, and may be similar to long short-term memory with a forget gate, and may not include an output gate in some embodiments. The gated recurrent unit neural network 130 may retain the resisting vanishing gradient properties of long short-term memory, and may include two gates (e.g., reset and update gates). The gated recurrent unit neural network 130 may therefore avoid issues due to short-term memory, and may be configured to use previous determinations in subsequent predictions or determinations. Other embodiments may implement different recurrent neural networks.

Figure 4:
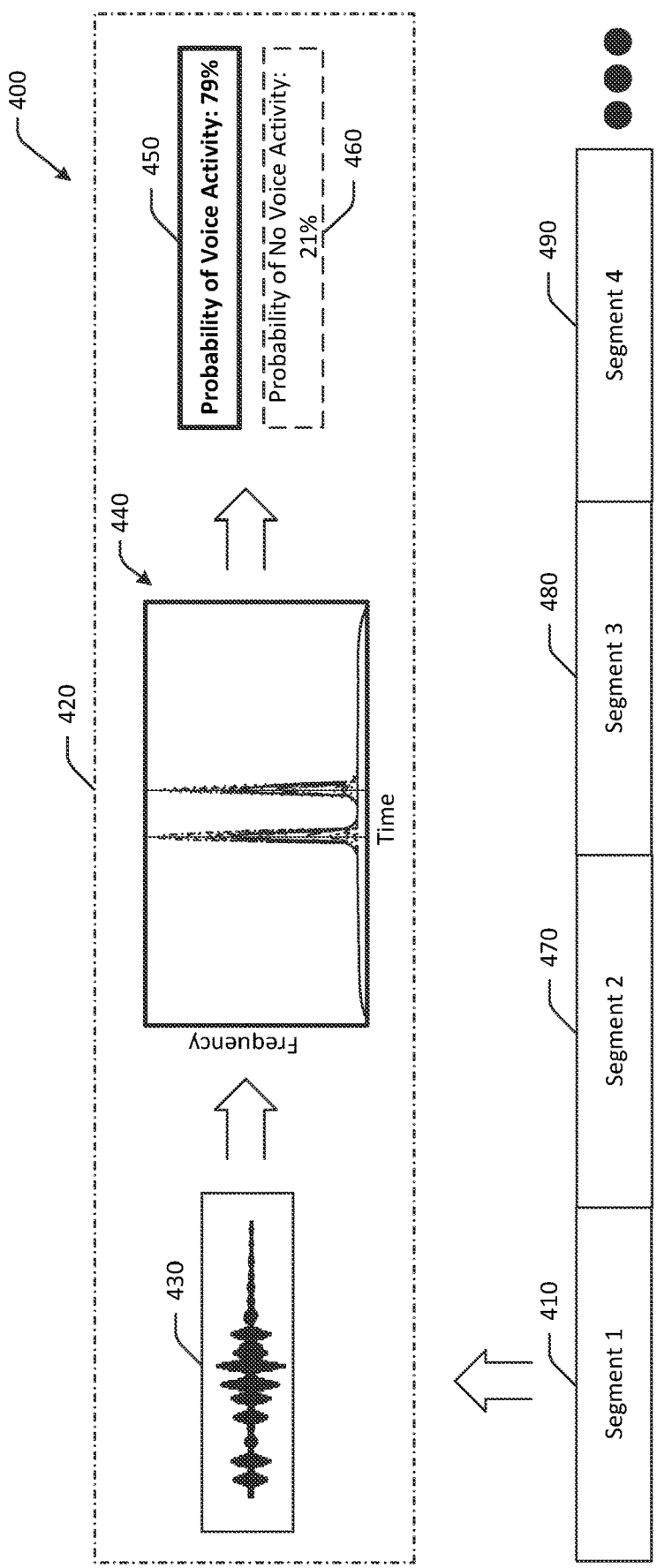
FIG. 4 is a schematic illustration of an example use case for language agnostic automated voice activity detection in accordance with one or more example embodiments of the disclosure.

The gated recurrent unit neural network 130 may be configured to determine the times at which voice activity occurs in the audio data 120. For example, in some embodiments, the gated recurrent unit neural network 130 may determine audio data 120 that has been separated into non-overlapping or overlapping segments. The gated recurrent unit neural network 130 may output segment data 140, which indicates whether voice activity, or human speech, is or is not present in each segment. To determine whether speech is present, the gated recurrent unit neural network 130 may use one or more spectrograms, as illustrated in FIG. 4. The segment data 140 may be used to automatically generate an empty subtitle file 150. As illustrated in FIG. 1, the empty subtitle file 150 may include start and end timestamps corresponding to instances where human speech is present in the audio data 120, and a manual operator may input subtitle text. As a result, manual operators may not have to generate the empty subtitle file 150, and optionally may not have to determine a duration for which the subtitle is to persist.

In some embodiments, to generate empty subtitle files, an example process flow 160 is presented and may be performed, for example, by one or more subtitle file generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 160 of FIG. 1.

At block 162, the remote server may determine an audio file associated with content. For example, the remote server may determine the audio data 120 associated with the digital content 110. In some instances, the remote server may extract the audio from video content.

At block 164, the remote server may separate the audio file into segments. For example, the remote server may separate the audio data 120 into discrete audio segments having a length of, for example, 800 milliseconds. The audio segments may be overlapping or non-overlapping. For example, the remote server may generate a first audio segment (e.g., "segment 1" in FIG. 1) and a second audio segment (e.g., "segment 2" in FIG. 1) using the audio data 120. The remote server may use the gated recurrent unit neural network 130 to determine whether voice activity is present in each of the audio segments.

At block 166, the remote server may determine whether speech is present in the segments using the gated recurrent unit neural network 130. For example, the gated recurrent unit neural network 130 may be configured to analyze some or each of the audio segments in order to determine whether voice activity occurs in the segment. In some instances, the gated recurrent unit neural network 130 may determine a probability value indicative of whether speech is present in a given segment. If the probability is equal to or greater than a threshold value, the segment may be determined to include voice activity. If the probability is equal to or less than the threshold value, the segment may be determined not to include voice activity. In the example of FIG. 1, the gated recurrent unit neural network 130 may determine that human speech is present in the first audio segment, and that human speech is not present in the second audio segment. As illustrated in FIG. 1, the gated recurrent unit neural network 130 may generate labels indicating whether speech occurs in a segment in the segment data 140. For example, the first audio segment may be associated with a speech present label, and the second audio segment may be associated with a speech not present label.

At block 168, the remote server may determine timestamps associated with respective segments. The timestamps may be used, in one example, to determine a duration during which corresponding subtitle text is to be presented. In another example, the timestamps may be used to populate an empty subtitle file. For example, the gated recurrent unit neural network 130 may determine a first timestamp corresponding to a start of the first audio segment, and a second timestamp corresponding to an end of the first audio segment, and so forth. In some embodiments, the gated recurrent unit neural network 130 may generate a speech present label for association with the first timestamp and the second timestamp. The gated recurrent unit neural network 130 may determine a third timestamp corresponding to a start of the second audio segment, and a fourth timestamp corresponding to an end of the second audio segment. The gated recurrent unit neural network 130 may optionally generate a speech not present label for association with the third timestamp and the fourth timestamp.

At block 170, the remote server may generate an empty subtitle file. For example, the gated recurrent unit neural network 130 may output the segment data 140. The remote server may, using the segment data 140, generate the empty subtitle file 150. In some embodiments, the gated recurrent unit neural network 130 may generate the empty subtitle file 150. As illustrated in FIG. 1, the empty subtitle file may include an indication that speech is present between the first timestamp and the second timestamp. The empty subtitle file may not include a transcription of the speech, or may otherwise be blank as to the subtitle text itself.

As a result, automated empty subtitle files may be generated, and may be relatively more accurate than manually generated subtitle files, due in part to increased granularity of audio segments. In addition, duration of presentation may be automatically determined using one or more rules, as discussed herein.

Embodiments of the disclosure may include gated recurrent unit neural networks that are robust with respect to various types and levels of input noise, and are configured to detect voice activity regardless of a spoken language. To train gated recurrent unit neural networks as described herein, a training dataset may be manually generated. An unsupervised filtering methodology may be used to reduce the effect of label noise. Accordingly, a recurrent neural network may be trained using data that is processed with an unsupervised filtering method to correct label noise. Such filtering may improve the quality of the training data by reducing or removing noise in closed caption or other training data, which in turn may increase accuracy of the recurrent neural network.

Certain embodiments may accurately detect voice activity regardless of background sounds, sound effects, music, and other audio features that may appear in audio data. The gated recurrent unit neural networks as described herein may be better suited for sequence learning over other non-neural classification models because certain embodiments may learn a useful, factored and a continuous state space, as opposed to a discrete state space of other methods. In addition, some embodiments can learn non-linear temporal dynamics present in the input.

Some embodiments may include two-layered bidirectional gated recurrent unit neural networks with two fully connected residual layers at the output of the gated recurrent unit neural network. Some embodiments may include added spectral normalization to each convolution layer, which enables a better gradient propagation through the network. A residual block stacks two dilated causal convolution layers together, and the results from the final convolution are added back to the inputs to obtain the outputs of the block. Some embodiments may use a network with two residual blocks and two residual fully connected layer at the output of residual blocks.

To train gated recurrent unit neural networks and/or models, certain features may be used, such as spectrogram and log-mel. The features for spectrogram may be generated using the window size of 1,200, hop-length of 720 (10 milliseconds overlap) and 128 frequency bins. The window size, hop length and number of mels for log-mel features may be 1,200, 720 and 128 respectively. The models may be trained with dropout probability of 0.3, weight decay of $10^{-7}$, gradient clipping of 5, initial learning rate of 10-3 with a 149 decay of 0.1 at 10 and 15 epochs, and may be trained for 20 epochs.

In some embodiments, testing of models may be performed using existing subtitle data. For example, a remote server may determine a subtitle file and a first audio file for a first movie, where the subtitle file includes subtitle data representing dialogue that occurs in the first movie. The subtitle file may include text data and corresponding timestamp data indicative of when certain text is to be presented as a subtitle. The remote server may extract the timestamp data from the subtitle file. The remote server may train a gated recurrent unit neural network using the timestamp data and the audio file, where the gated recurrent unit neural network is configured to determine whether human speech is present in an audio segment. Experimental results indicate that gated recurrent unit neural networks of some embodiments perform with over 92% accuracy regardless of input noise (e.g., mislabeled segments in training data, etc.), and actual noise (e.g., random background noise in audio files, etc.). Testing included addition of random background noise to audio segments to ensure robustness. For example, the remote server may modify the first audio file to include random background noise, and the resultant audio may be used to test gated recurrent unit neural network model robustness.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of voice activity. As a result of improved functionality, empty subtitle files may be automatically generated and may include timestamp and/or duration data. Embodiments of the disclosure may improve computing efficiency and bandwidth by reducing a number of manual operations and making an inexact process uniform and/or consistent. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
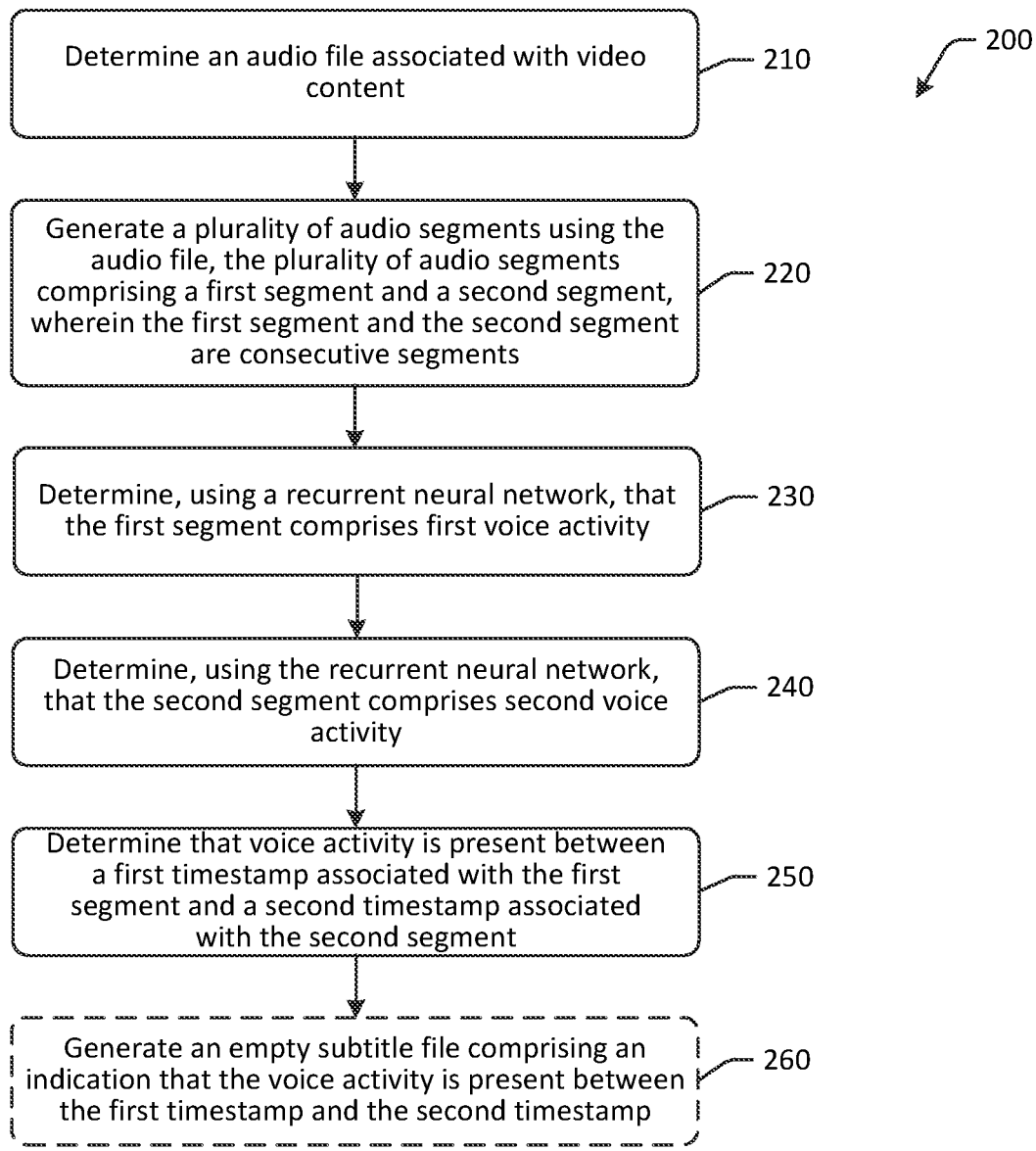
FIG. 2 is a schematic illustration of an example process flow for language agnostic automated voice activity detection in accordance with one or more example embodiments of the disclosure.

FIG. 2 depicts an example process flow 200 for language agnostic automated voice activity detection in accordance with one or more example embodiments of the disclosure. While example embodiments of the disclosure may be described in the context of movies or other video content, it should be appreciated that the disclosure is more broadly applicable to any type of digital content, such as series of audio or video content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine an audio file associated with video content. For example, one or more content processing engines executed at a remote server may determine an audio file associated with video content. The audio file may be audio data in file format, or in any other suitable format, and may be associated with digital content. In some embodiments, the audio file may be associated with video content. In some instances, the audio file may be generated by extracting audio data from video content.

At block 220 of the process flow 200, computer-executable instructions stored on a memory of a device, such as a remote server or a user device, may be executed to generate a plurality of audio segments using the audio file, the plurality of audio segments comprising a first segment and a second segment, wherein the first segment and the second segment are consecutive segments. For example, one or more voice activity detection engines at a remote server may generate one or more, or a plurality of audio segments using the audio file. In some embodiments, the voice activity detection engine may separate or segment the audio file into audio segments having a certain length, such as about 800 milliseconds. The audio segments may be non-overlapping audio segments. In other instances, the audio segments may be at least partially overlapping. For example, the audio segments may overlap by about 50 milliseconds or about 100 milliseconds. The plurality of audio segments may include a first segment and a second segment, where the first segment and the second segment are consecutive segments.

At block 230 of the process flow 200, computer-executable instructions stored on a memory of a device, such as a remote server or a user device, may be executed to determine, using a recurrent neural network, that the first segment comprises first voice activity. For example, one or more voice activity detection engines at a remote server may determine, using a recurrent neural network, that the first segment comprises first voice activity. The recurrent neural network may be a form of long short-term memory, such as a gated recurrent unit. The neural network may be used to determine whether voice activity, such as human speech, is present in an audio clip or audio segment. To determine whether voice activity is present in an audio segment, the neural network may be used to output probability values indicating a likelihood that the audio segment includes voice activity. For example, the neural network may output a first probability value indicating that voice activity is present, and a second probability value indicating that voice activity is not present. The recurrent neural network may be a gated recurrent unit neural network.

At block 240 of the process flow 200, computer-executable instructions stored on a memory of a device, such as a remote server or a user device, may be executed to determine, using the recurrent neural network, that the second segment comprises second voice activity. For example, one or more voice activity detection engines at a remote server may determine, using the recurrent neural network, that the second segment comprises second voice activity. The voice activity detection engine may therefore determine that the first audio segment and the second audio segment both include voice activity.

At block 250 of the process flow 200, computer-executable instructions stored on a memory of a device, such as a remote server or a user device, may be executed to determine that voice activity is present between a first timestamp associated with the first segment and a second timestamp associated with the second segment. For example, one or more voice activity detection engines at a remote server may determine that voice activity is present between a first timestamp associated with the first segment and a second timestamp associated with the second segment. To determine the first timestamp, the voice activity detection engine may determine a starting timestamp associated with the first audio segment, and for the second timestamp, the voice activity detection engine may determine a starting timestamp associated with the second audio segment. Other timestamp locations may be used, such as a midpoint timestamp, an ending timestamp, and so forth. The voice activity detection engine may determine that voice activity is present between the respective timestamps, and may optionally generate an indication or notification that indicates the presence of voice activity in the respective audio segments. In some embodiments, the notification may reflect the presence of voice activity across both the first segment and the second segment, as opposed to, or in addition to, the individual segment notifications.

At optional block 260 of the process flow 200, computer-executable instructions stored on a memory of a device, such as a remote server or a user device, may be executed to generate an empty subtitle file comprising an indication that the voice activity is present between the first timestamp and the second timestamp. For example, one or more subtitle file generation engines or modules at a remote server may generate an empty subtitle file comprising an indication that the voice activity is present between the first timestamp and the second timestamp. The empty subtitle file may include timestamp data related to times at which voice activity appears or occurs in the content. Operators may complete the empty subtitle file with subtitle text after listening and/or watching the content. The empty subtitle file may not include a transcription of the voice activity. In some embodiments, generation of the empty subtitle file, and identification of voice activity, may be agnostic as to language. For example, the first audio segment may include voice activity of a first language, and the second audio segment may include voice activity of a second language. The neural network model may nonetheless detect the presence of the voice activity regardless of language.

Figure 3:
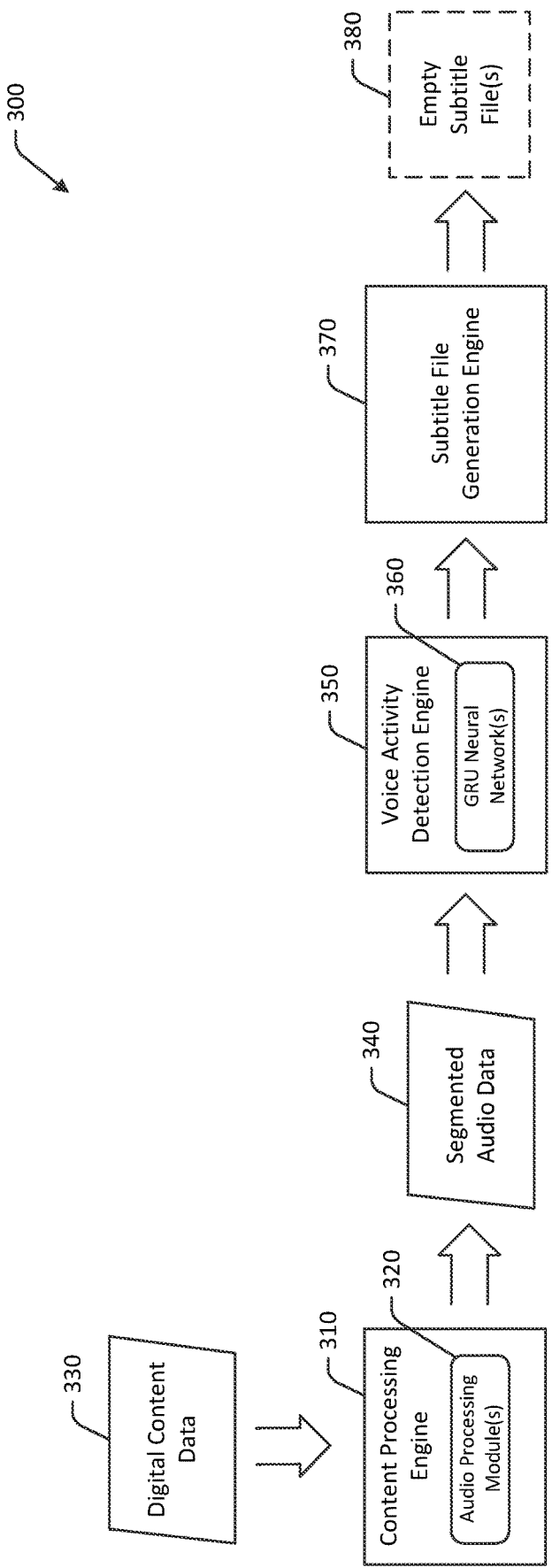
FIG. 3 is a hybrid schematic illustration of an example process and data flow in accordance with one or more example embodiments of the disclosure.

FIG. 3 schematically illustrates an example data flow 300 and neural network mode inputs and outputs for language agnostic automated voice activity detection in accordance with one or more example embodiments of the disclosure. Different embodiments may include different, additional, or fewer inputs or outputs than those illustrated in the examples of FIG. 3.

In FIG. 3, an example data flow 300 is schematically depicted. A content processing engine 310 may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more audio processing modules 330. Additional or fewer, or different, modules may be included. The audio processing module(s) 330 may be configured to process and/or analyze audio content, such as audible dialog, sound effects, music, and other audio. In some instances, the audio processing module(s) 330 may be configured to separate audio into audio segments, such as audio segments having a length of about 500 milliseconds to about 1000 milliseconds.

The content processing engine 310 may receive one or more inputs for content for which segmented audio data 30 is to be generated. For example, the content processing engine 310 may receive digital content data 330. The digital content data 330 may include video data, audio data, and/or text data. In some embodiments, the video data, audio data, and/or text data may be extracted from a content file.

The content processing engine 310 may process the respective data associated with the content for which the segmented audio data 340 is to be generated. For example, the content processing engine 310 may include one or more audio processing module(s) 320 that may be used to process audio data of the digital content data 330.

Using one or more algorithms or modules, the content processing engine 310 may determine the segmented audio data 340. The segmented audio data 340 may include audio data that is separated into segments. Some or all of the segments may have the same length.

The segmented audio data 340 may be input at a voice activity detection engine 350. The voice activity detection engine 350 may be configured to determine whether voice activity is present in any of the audio segments. To determine whether voice activity is present, the voice activity detection engine 350 may convert the audio segment into a spectrogram and use the resultant two-dimensional output to generate a probability value indicative of whether voice activity is present in a specific segment. The process may be repeated for some or all audio segments.

Output from the voice activity detection engine 350 may be fed as an input to a subtitle file generation engine 370. The subtitle file generation engine 370 may be configured to generate an empty subtitle file for the digital content data 330. The subtitle file generation engine 370 may include one or more machine learning components that may be configured to improve output. The subtitle file generation engine 370 may be optionally configured to output one or more empty subtitle files 380. In other embodiments, the subtitle file generation engine 370 may be configured to output notifications related to speech or voice activity density, errors in subtitle placement, and other outputs.

FIG. 4 is a schematic illustration of an example use case 400 for language agnostic automated voice activity detection in accordance with one or more example embodiments of the disclosure. Other embodiments may include different components.

In the use case 400 of FIG. 4, a gated recurrent unit neural network may be configured to process one or more spectrograms for individual audio segments, and, using the spectrograms, generate probability outputs indicative of whether the audio segment includes voice activity.

For example, digital content may include a first audio segment 410, a second audio segment 470, a third audio segment 480, a fourth audio segment 490, and so forth. The audio segments may be associated with video content in some embodiments. The audio segments may be non-overlapping.

A gated recurrent unit neural network 420 may process the audio segments to detect voice activity. For example, the gated recurrent unit neural network 420 may process or analyze the first audio segment 410. The first audio segment 410 may include an audio component 430. The gated recurrent unit neural network 420 may generate a spectrogram 440, such as a magnitude spectrogram, using the audio component 430. The spectrogram 440 may include frequency along a vertical axis and time along a horizontal axis. Using the spectrogram 440, the gated recurrent unit neural network 420 may determine one or more probability values. For example, the gated recurrent unit neural network 420 may determine a first probability value 450 indicative of whether the first audio segment 410 includes voice activity, and may determine a second probability value 460 indicative of whether the first audio segment 410 does not include voice activity. If one of the probability values is greater than a threshold, the gated recurrent unit neural network 420 may determine that the first audio segment 410 does or does not include voice activity accordingly.

The gated recurrent unit neural network 420 may therefore be used to generate a first spectrogram using the first segment, and a second spectrogram using the second segment. The gated recurrent unit neural network 420 may process the first spectrogram and the second spectrogram using the recurrent neural network. The gated recurrent unit neural network 420 may associate a first voice activity present label with the first segment, and a second voice activity present label with the second segment. In some embodiments, the gated recurrent unit neural network 420 may determine a first probability value indicative of voice activity being present in the first segment, and a second probability value indicative of voice activity not being present in the first segment. The gated recurrent unit neural network 420 may determine, in some instances, that the first probability value is greater than the second probability value, and may make a determination as to whether voice activity is present accordingly.

Figure 5:
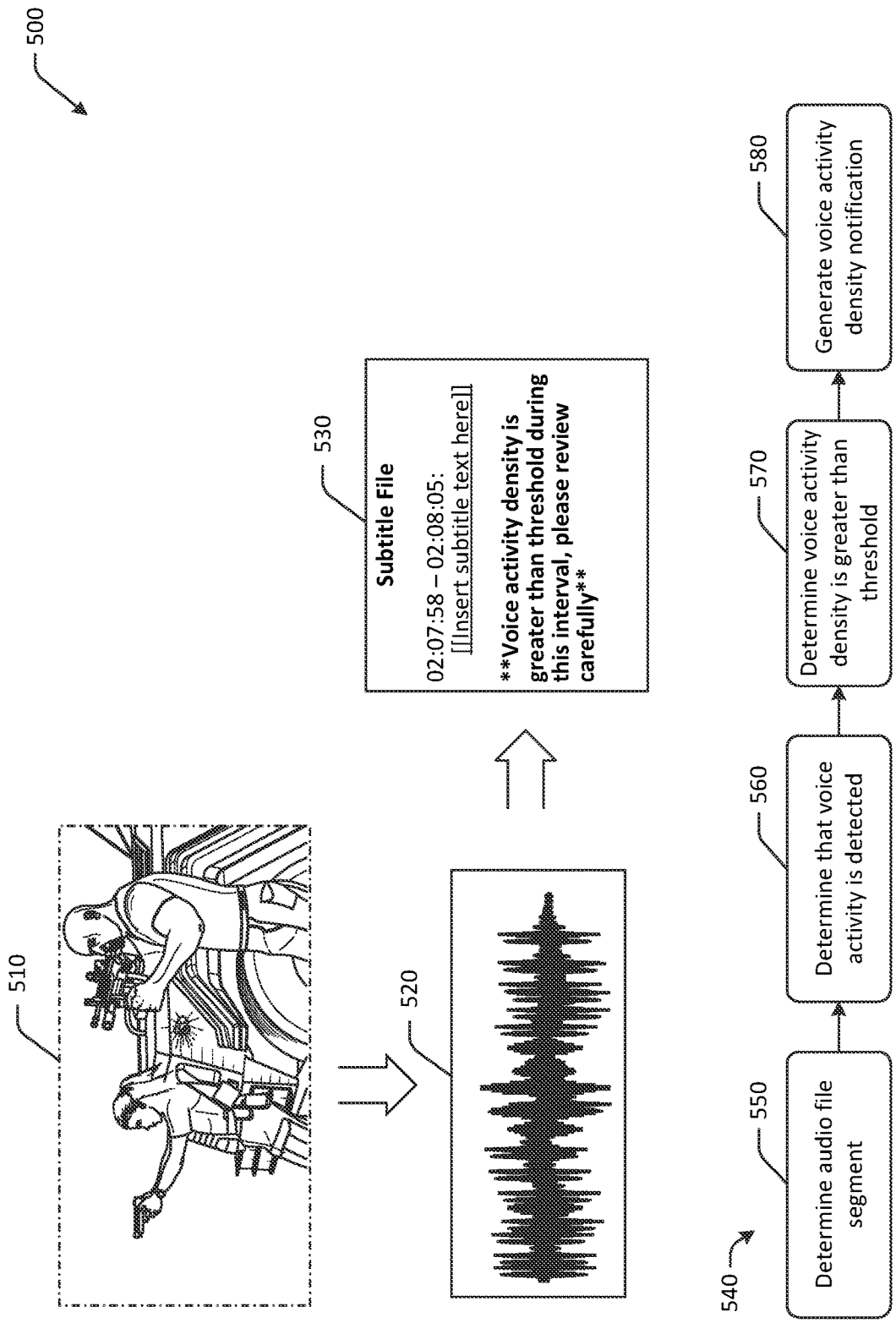
FIG. 5 is a schematic illustration of an example use case for automated empty subtitle file generation in accordance with one or more example embodiments of the disclosure.

FIG. 5 is a schematic illustration of an example use case 500 for automated empty subtitle file generation in accordance with one or more example embodiments of the disclosure. Other embodiments may include additional, fewer, or different components.

In FIG. 5, a gated recurrent unit neural network may be configured to determine speech or voice activity density in a content segment. The voice activity density may be helpful in generating notifications for manual operators that are inputting subtitle text to pay attention to certain portions of content.

For example, a content scene 510 may include two users talking at once, along with background noise and music. Embodiments of the disclosure may determine audio content 520 associated with the content scene 510. The gated recurrent unit neural network may be configured to determine voice activity density in the scene. For example, the gated recurrent unit neural network may generate an output of a subtitle file 530 that includes a notification indicating that "voice activity density is greater than a threshold during this interval, please review carefully." The threshold may be static or dynamic, and may be adjusted by users.

To determine voice activity density, one or more servers may implement process flow 540. For example, at block 550, the servers may determine an audio file segment, such as the audio segment 520. At block 560, the servers may determine that voice activity is detected, such as by processing the audio segment using a gated recurrent unit neural network. At block 570, the servers may determine that voice activity density is greater than a threshold, which may be preset or manually adjusted. At block 580, the servers may generate a voice activity density notification, such as that illustrated in the empty subtitle file 530 (e.g., a high speech density notification associated with the first timestamp in the empty subtitle file 530, etc.).

Figure 6:
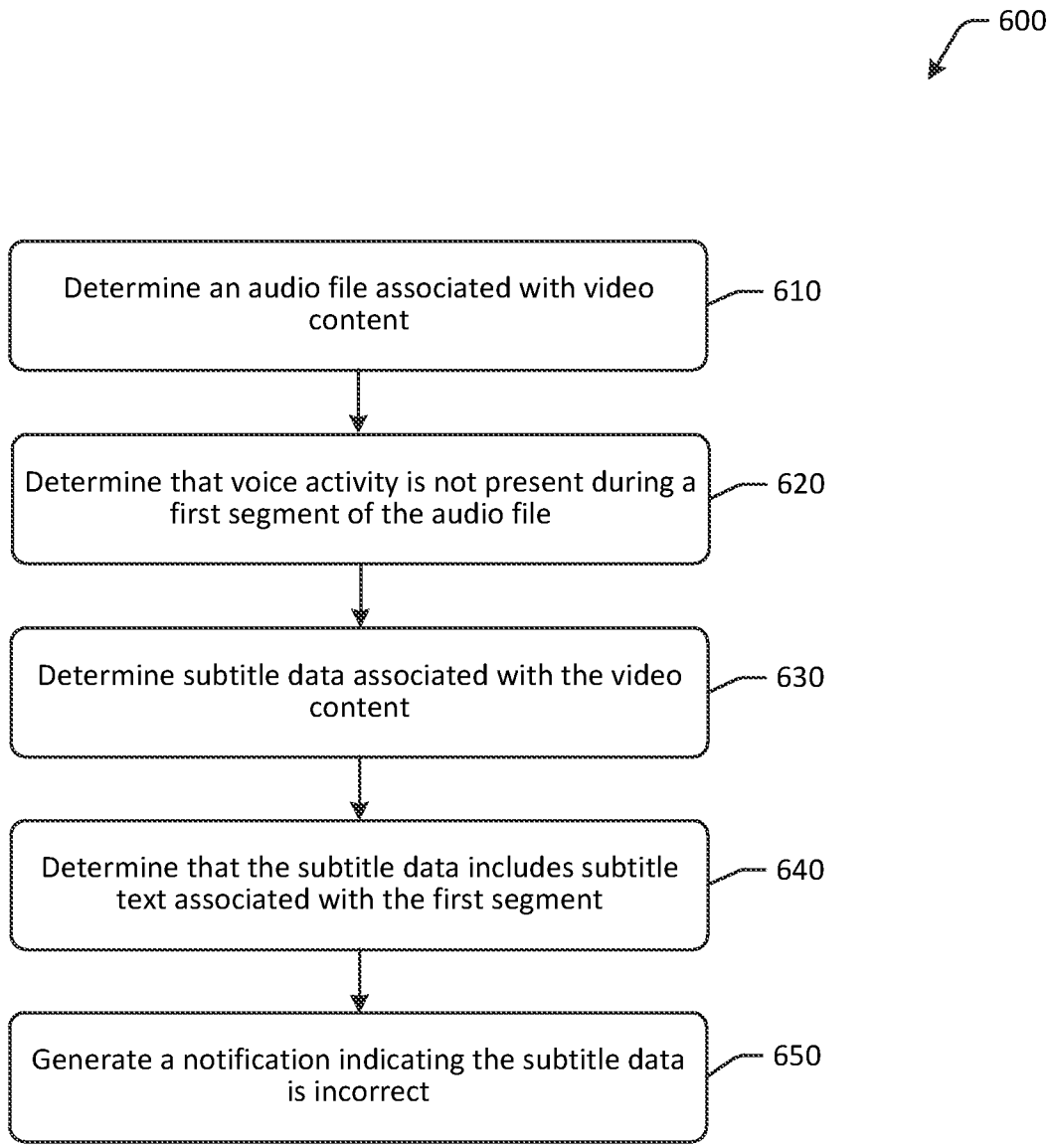
FIG. 6 is a schematic illustration of an example process flow for language agnostic automated voice activity detection in accordance with one or more example embodiments of the disclosure.

FIG. 6 depicts an example process flow 600 for language agnostic automated voice activity detection in accordance with one or more example embodiments of the disclosure. The process flow 600 may be used to maintain quality across different versions of content.

While example embodiments of the disclosure may be described in the context of movies or other video content, it should be appreciated that the disclosure is more broadly applicable to any type of digital content, such as series of audio or video content. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a remote server or a user device, may be executed to determine an audio file associated with video content. For example, one or more content processing engines executed at a remote server may determine an audio file associated with video content. The audio file may be audio data in file format, or in any other suitable format, and may be associated with digital content. In some embodiments, the audio file may be associated with video content. In some instances, the audio file may be generated by extracting audio data from video content.

At block 620 of the process flow 600, computer-executable instructions stored on a memory of a device, such as a remote server or a user device, may be executed to determine, using a recurrent neural network, that voice activity is not present during a first segment of the audio file. For example, one or more voice activity detection engines at a remote server may determine, using a recurrent neural network, that voice activity is not present during a first segment of the audio file. The recurrent neural network may be a form of long short-term memory, such as a gated recurrent unit. The neural network may be used to determine whether voice activity, such as human speech, is present in an audio clip or audio segment. To determine whether voice activity is present in an audio segment, the neural network may be used to output probability values indicating a likelihood that the audio segment includes voice activity. For example, the neural network may output a first probability value indicating that voice activity is present, and a second probability value indicating that voice activity is not present. The recurrent neural network may be a gated recurrent unit neural network.

At block 630 of the process flow 600, computer-executable instructions stored on a memory of a device, such as a remote server or a user device, may be executed to determine subtitle data associated with the video content. For example, one or more voice activity detection engines at a remote server may determine subtitle data associated with the video content. The subtitle data may include subtitle text, times of presentation, and duration of presentation.

At block 640 of the process flow 600, computer-executable instructions stored on a memory of a device, such as a remote server or a user device, may be executed to determine that the subtitle data includes subtitle text associated with the first segment. For example, one or more voice activity detection engines at a remote server may determine that the subtitle data includes subtitle text associated with the first segment using timestamps associated with the first segment.

At block 650 of the process flow 600, computer-executable instructions stored on a memory of a device, such as a remote server or a user device, may be executed to generate a notification indicating the subtitle data in incorrect. For example, one or more voice activity detection engines at a remote server may generate a notification indicating the subtitle data in incorrect. This may be because there is subtitle text associated with timestamps during which no voice activity is present. Accordingly, operators may review the subtitle data to ensure correctness and/or to make updates.

The process flow 600 may be implemented, in one example, when comparing subtitle data for different versions of the same content. For example, the server may determine that there is a discrepancy between a first empty subtitle file for a first version of content, and a second empty subtitle file for a second version of content. The servers may therefore generate a manual review notification.

In some embodiments, the servers may determine that the timestamp data indicates speech is present for a length of time that exceeds a threshold. The threshold may indicate a long period of time in which voice activity is present. The servers may determine a first portion of audio corresponding to the speech, and may determining that the speech is not present for the duration of the length of time. The servers may automatically determine adjusted timestamp data indicative of a second portion of the audio for which speech is not present.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
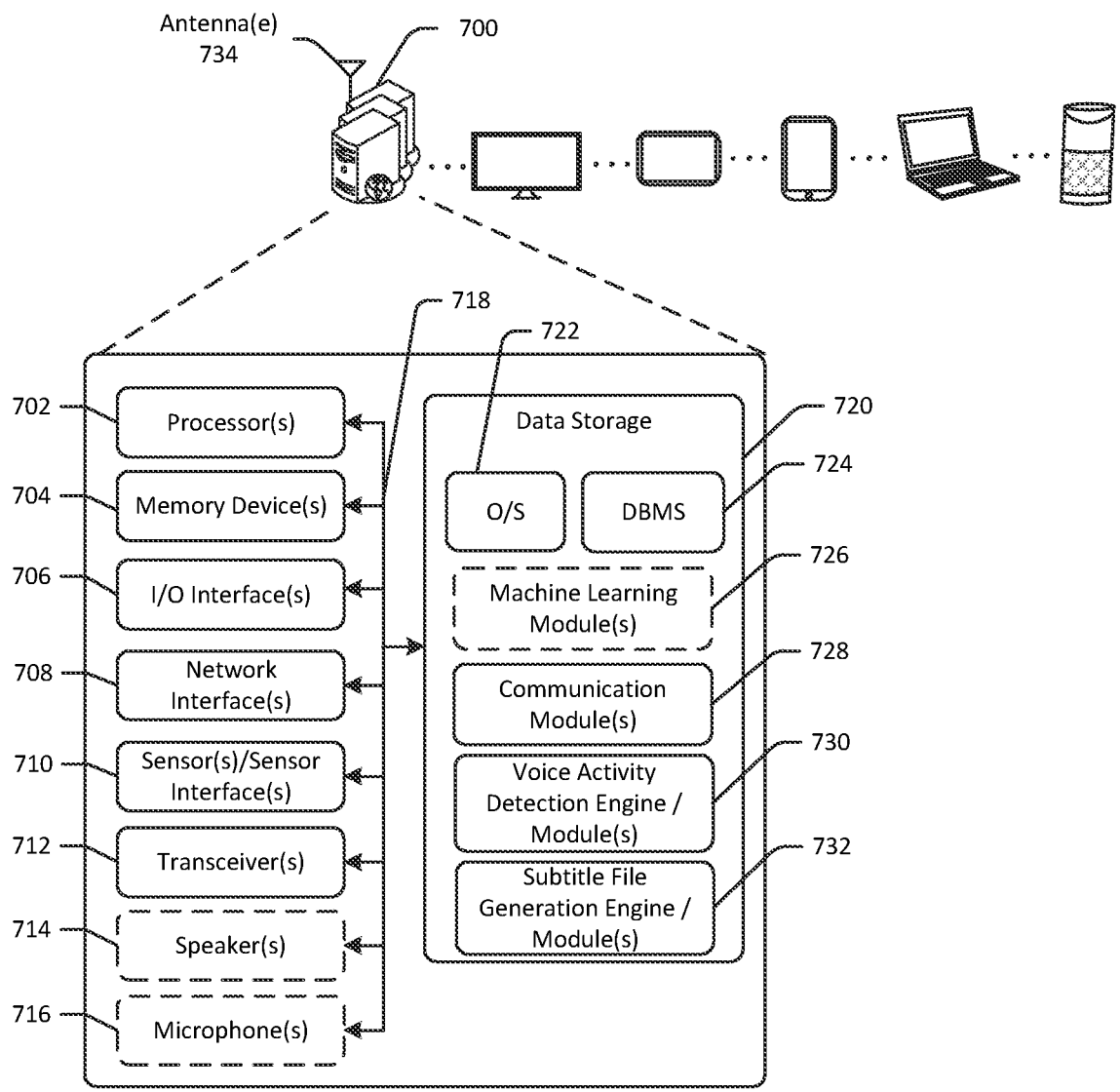
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of voice activity detection functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more voice activity detection engine/module(s) 730, and/or one or more subtitle file generation engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, subtitle information, user profile information, historical content consumption information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining summary length, determining importance thresholds, determining accuracy of identified segments, determining feedback from manual operators, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The voice activity detection engine/module(s) 730 may include computer-executable instructions, code, or the like that responsive to execution by one or more of the processor(s) 702 may perform functions including, but not limited to, analyzing digital content, extracting audio, determining subtitle or caption data, extracting segments of content, generating spectrograms, determining probability values indicative of the presence of speech, determining whether speech or voice activity is present in audio, and the like.

The subtitle file generation engine/module(s) 732 may include computer-executable instructions, code, or the like that responsive to execution by one or more of the processor(s) 702 may perform functions including, but not limited to, generating notifications, generating subtitle files, generating empty subtitle files, determining timestamps, determining outputs of GRU neural networks, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna(e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to memory, an audio file associated with video content;
    generating a plurality of audio segments using the audio file, the plurality of audio segments comprising a first segment and a second segment;
    determining that the first segment comprises first voice activity;
    determining that the second segment comprises second voice activity;
    determining that voice activity is present between a first timestamp associated with the first segment and a second timestamp associated with the second segment;
    generating an empty subtitle file comprising an indication that the voice activity is present between the first timestamp and the second timestamp; and
    generating text data representing the voice activity that is present between the first timestamp and the second timestamp.

2. The method of claim 1, wherein determining that the first segment comprises first voice activity comprises determining, using a recurrent neural network, that the first segment comprises first voice activity.

3. The method of claim 1, wherein the first segment and the second segment are consecutive segments; or
    wherein the first segment and the second segment are at least partially overlapping segments.

4. The method of claim 1, wherein the text data comprises a transcription of the voice activity.

5. The method of claim 1, further comprising:
    determining that a density of the first voice activity is equal to or greater than a threshold; and
    generating a high speech density notification associated with the first timestamp.

6. The method of claim 1, further comprising:
    generating a first spectrogram using the first segment, and a second spectrogram using the second segment;
    processing the first spectrogram and the second spectrogram using a neural network; and
    associating a first voice activity present label with the first segment, and a second voice activity present label with the second segment.

7. The method of claim 1, wherein the video content is a first version of the video content, the audio file is a first audio file, and the text data is first text data, the method further comprising:
    determining a second audio file associated with a second version of the video content;
    generating second text data for the second version using the second audio file;
    determining that there is a discrepancy between the first text data and the second text data; and
    generating a manual review notification.

8. The method of claim 1, wherein the plurality of audio segments further comprises a third segment, the method further comprising:
    determining, using a neural network, that the third segment does not comprise voice activity; and
    associating a first voice activity present label with the first segment, a second voice activity present label with the second segment, and a voice activity not present label with the third segment.

9. The method of claim 1, wherein the first voice activity is in a first language, and the second voice activity is in a second language.

10. A system comprising:
    memory configured to store computer-executable instructions; and
    at least one computer processor configured to access the memory and execute the computer-executable instructions to:
        determine, by one or more computer processors coupled to memory, a first audio file associated with a first version of video content;
        generate a plurality of audio segments using the first audio file, the plurality of audio segments comprising a first segment and a second segment;
        determine that the first segment comprises first voice activity;
        determine that the second segment comprises second voice activity;
        determine that voice activity is present between a first timestamp associated with the first segment and a second timestamp associated with the second segment;
        generate first text data representing the voice activity that is present between the first timestamp and the second timestamp;
        determine a second audio file associated with a second version of the video content;
        generate second text data for the second version using the second audio file;
        determine that there is a discrepancy between the first text data and the second text data; and
        generate a manual review notification.

11. The system of claim 10, wherein the at least one processor is configured to determine that the first segment comprises first voice activity by:
    determine, using a recurrent neural network, that the first segment comprises first voice activity.

12. The system of claim 10, wherein the first segment and the second segment are consecutive segments; or
    wherein the first segment and the second segment are at least partially overlapping segments.

13. The system of claim 10, wherein the at least one processor is further configured to access the memory and execute the computer-executable instructions to:

generate an empty subtitle file comprising an indication that the voice activity is present between the first timestamp and the second timestamp.

14. The system of claim 10, wherein the first text data comprises a transcription of the voice activity.

15. The system of claim 10, wherein the at least one processor is further configured to access the memory and execute the computer-executable instructions to:
   determine that a density of the first voice activity is equal to or greater than a threshold; and
   generate a high speech density notification associated with the first timestamp.

16. The system of claim 10, wherein the at least one processor is further configured to access the memory and execute the computer-executable instructions to:
   generate a first spectrogram using the first segment, and a second spectrogram using the second segment;
   process the first spectrogram and the second spectrogram using a neural network; and
   associate a first voice activity present label with the first segment, and a second voice activity present label with the second segment.

17. The system of claim 10, wherein the plurality of audio segments further comprises a third segment, and wherein the at least one processor is further configured to access the memory and execute the computer-executable instructions to:
   determine, using a neural network, that the third segment does not comprise voice activity; and
   associate a first voice activity present label with the first segment, a second voice activity present label with the second segment, and a voice activity not present label with the third segment.

18. The system of claim 10, wherein the first voice activity is in a first language, and the second voice activity is in a second language.

19. The system of claim 13, wherein the first text data is generated after the empty subtitle file.

20. The method of claim 1, wherein the text data is generated after the empty subtitle file.

\* \* \* \* \*